United States Patent
Trager et al.

(10) Patent No.: US 11,628,898 B1
(45) Date of Patent: Apr. 18, 2023

(54) VIBRATION ISOLATION FOR BICYCLE SADDLE USING SUPER ELASTIC MATERIAL MEMBERS

(71) Applicant: Toyota Motor Engineering & Manufacturing North America, Inc., Plano, TX (US)

(72) Inventors: Christian Arthur Trager, Canton, MI (US); Paul A. Gilmore, Ann Arbor, MI (US); Umesh N. Gandhi, Farmington Hills, MI (US); Ryohei Tsuruta, Ann Arbor, MI (US); Michael Paul Rowe, Pinckney, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/571,951

(22) Filed: Jan. 10, 2022

(51) Int. Cl.
*B62J 1/06* (2006.01)

(52) U.S. Cl.
CPC ..................... *B62J 1/065* (2013.01)

(58) Field of Classification Search
CPC ................ B62J 1/065; F16F 2228/066; F16F 2228/063; F16F 2224/0258
See application file for complete search history.

(56) References Cited

U.S. PATENT DOCUMENTS

| | | |
|---|---|---|
| 82,276 A | 9/1868 | Belleville |
| 1,826,597 A | 10/1931 | Brecht |
| 2,121,835 A | 6/1938 | Sproul |
| 2,655,935 A | 10/1953 | Kinzbachs |
| 2,753,177 A | 7/1956 | Boyd |
| 2,973,015 A | 2/1961 | Thompson |
| 2,991,655 A | 7/1961 | Jorgensen et al. |
| 3,080,160 A | 3/1963 | Omer |
| 3,366,082 A | 1/1968 | Ross |
| 3,394,631 A | 7/1968 | Thompson |
| 3,430,942 A | 3/1969 | Webb et al. |
| 3,559,512 A | 2/1971 | Aggarwal |
| 3,574,347 A | 4/1971 | Hughes |

(Continued)

FOREIGN PATENT DOCUMENTS

| | | | |
|---|---|---|---|
| CN | 202811955 U | | 3/2013 |
| CN | 103899704 B | * | 11/2015 |

(Continued)

OTHER PUBLICATIONS

U.S. Appl. No. 17/156,041, filed Jan. 22, 2021.

(Continued)

*Primary Examiner* — Milton Nelson, Jr.
(74) *Attorney, Agent, or Firm* — Christopher G. Darrow; Darrow Mustafa PC

(57) ABSTRACT

A vibration isolator can be configured to provide improved vibration isolation performance, such as in connection with a bicycle saddle. The bicycle saddle can be operatively connected to a bicycle frame. The vibration isolator can be located within a portion of the bicycle frame. The vibration isolator can be operatively positioned with respect to the bicycle saddle. The vibration isolator being configured to exhibit a non-linear stiffness profile. The non-linear stiffness profile can include a region of quasi-zero stiffness. The vibration isolator including one or more super elastic material members.

17 Claims, 9 Drawing Sheets

(56) References Cited

U.S. PATENT DOCUMENTS

| | | |
|---|---|---|
| 3,608,883 A | 9/1971 | Russold et al. |
| 3,743,266 A | 7/1973 | Sturman et al. |
| 3,836,195 A | 9/1974 | Teeri |
| 3,856,242 A | 12/1974 | Cook |
| 3,858,665 A | 1/1975 | Winker |
| 3,873,079 A | 3/1975 | Kuus |
| 3,980,016 A | 9/1976 | Taylor |
| 4,168,101 A | 9/1979 | DiGrande |
| 4,215,841 A | 8/1980 | Herring, Jr. |
| 4,351,556 A | 9/1982 | Worringer |
| 4,457,213 A | 7/1984 | Morgan |
| 4,530,491 A | 7/1985 | Bucksbee et al. |
| 4,612,429 A | 9/1986 | Milianowicz |
| 4,779,852 A | 10/1988 | Wassell |
| 4,799,654 A | 1/1989 | Eickmann |
| 4,824,338 A | 4/1989 | Eickmann |
| 4,850,643 A | 7/1989 | Rollman |
| 5,178,357 A | 1/1993 | Platus |
| 5,222,709 A | 6/1993 | Culley, Jr. et al. |
| 5,263,694 A | 11/1993 | Smith et al. |
| 5,301,974 A | 4/1994 | Knapp |
| 5,310,157 A | 5/1994 | Platus |
| 5,390,903 A | 2/1995 | Fidziukiewicz |
| 5,489,139 A | 2/1996 | McFarland |
| 5,669,594 A | 9/1997 | Platus et al. |
| 5,669,598 A | 9/1997 | Ticey et al. |
| 6,007,148 A | 12/1999 | Yu |
| 6,089,656 A | 7/2000 | Hals |
| 6,270,065 B1 | 8/2001 | Hals |
| 6,354,556 B1 | 3/2002 | Ritchie et al. |
| 6,371,463 B1 | 4/2002 | Sorovshian |
| 6,443,524 B1 | 9/2002 | Yu |
| 6,530,564 B1 | 3/2003 | Julien |
| 6,935,693 B2 | 8/2005 | Janscha et al. |
| 6,939,097 B2 | 9/2005 | Carr et al. |
| 7,152,839 B2 | 12/2006 | Mullinix et al. |
| 7,822,522 B2 | 10/2010 | Wereley et al. |
| 7,854,425 B2 | 12/2010 | Evans |
| 7,874,576 B2 | 1/2011 | Gandhi |
| 8,053,068 B2 | 11/2011 | Fanucci et al. |
| 8,166,626 B2 | 5/2012 | Sereni et al. |
| 8,185,988 B2 | 5/2012 | Wieland |
| 8,366,082 B2 | 2/2013 | Evans |
| 8,500,108 B2 | 8/2013 | Rode |
| 8,585,026 B2 | 11/2013 | Dittmar |
| 8,919,751 B2 | 12/2014 | Kneidel |
| 9,194,452 B2 | 11/2015 | Hawkins et al. |
| 9,394,950 B1 | 7/2016 | Henry et al. |
| 9,408,428 B2 | 8/2016 | Gaudet |
| 9,950,760 B2 | 4/2018 | Ahnert et al. |
| 9,957,007 B2 | 5/2018 | Bigolin |
| 10,371,229 B2 | 8/2019 | Gandhi et al. |
| 10,532,672 B1 | 1/2020 | Pinkelman et al. |
| 10,677,310 B2 | 6/2020 | Gandhi et al. |
| 11,137,045 B2 | 10/2021 | Gandhi et al. |
| 11,338,711 B1 | 5/2022 | Gilmore et al. |
| 2004/0245830 A1 | 12/2004 | Scheck et al. |
| 2007/0138720 A1 | 6/2007 | Evans |
| 2009/0025833 A1 | 1/2009 | Schussler |
| 2009/0226691 A1* | 9/2009 | Mankame ............ D07B 5/00 428/222 |
| 2012/0018577 A1 | 1/2012 | Quiroz-Hernandez |
| 2014/0265468 A1 | 9/2014 | Greenhill et al. |
| 2015/0298580 A1 | 10/2015 | Kanai |
| 2016/0009156 A1 | 1/2016 | Leonard et al. |
| 2016/0068085 A1 | 3/2016 | Mindel et al. |
| 2018/0195570 A1 | 7/2018 | Churchill et al. |
| 2018/0195571 A1 | 7/2018 | Churchill et al. |
| 2018/0312086 A1 | 11/2018 | Meingast et al. |
| 2019/0186587 A1 | 6/2019 | Gandhi et al. |
| 2019/0186588 A1 | 6/2019 | Gandhi et al. |
| 2019/0186589 A1 | 6/2019 | Gandhi et al. |
| 2020/0238781 A1 | 7/2020 | Hadi |
| 2020/0298732 A1 | 9/2020 | Gandhi et al. |
| 2020/0393013 A1 | 12/2020 | Schneider |
| 2022/0144152 A1 | 5/2022 | Gilmore et al. |
| 2022/0145957 A1 | 5/2022 | Gilmore et al. |
| 2022/0145958 A1 | 5/2022 | Gilmore et al. |
| 2022/0153370 A1 | 5/2022 | Gilmore et al. |

FOREIGN PATENT DOCUMENTS

| | | | |
|---|---|---|---|
| CN | 114033062 A | * | 2/2022 |
| JP | 2011201378 A | | 10/2011 |
| KR | 102106610 B1 | * | 5/2020 |
| TW | M612680 U | * | 6/2021 |
| WO | 2009027681 A1 | | 3/2009 |

OTHER PUBLICATIONS

Panagiotopoulos et al., "Advanced ultra-light multifunctional metallic-glass wave springs", Materials and Design, 2020 (10 pages).

Spaggiari et al., "Multiphysics Modelling and Design of Shape Memory Alloy Wave Springs as Linear Actuators", Proceedings of the ASME 2010 Conference on Smart Materials, Adaptive Structures and Intelligent Systems, Sep. 28-Oct. 1, 2010, Philadelphia, PA (9 pages).

Li et al., "A highly adjustable magnetorheological elastomer base isolator for real-time adaptive control", Smart Materials and Structures, Aug. 2013 (25 pages).

Carella et al., "Demonstrator to show the effects of negative stiffness on the natural frequency of a simple oscillator", MES (2008) Proceedings of the Institution of Mechanical Engineers, Part C: Journal of Mechanical Engineering Science, vol. 222 (7), pp. 1189-1192 (4 pages).

Le, Thanh Dahn et al., "Experimental investigation of a vibration isolation system using negative stiffness structure", International Journal of Mechanical Sciences (2013) International Journal of Mechanical Sciences 170 (2013) 99-112 (14 pages).

Lee, Thanh Danh et al., "A vibration isolation system in low frequency excitation region using negative stiffness structure for vehicle seat", Journal of Sound and Vibration 330 ( 2011) 6311-6335 (25 pages).

Lee, C.M et al., "A multi-stage high-speed railroad vibration isolation system with "negative" stiffness", Journal of Sound and Vibration 331 (2012) 914-921 (8 pages).

Lee, et al., "Position control of seat suspension with minimum stiffness," Journal of Sound and Vibration 292 (2006) 435-442 (8 pages).

"Belleville Springs," Encyclopedia of Vibration, 2001. (Year: 2001).

Trager et al., U.S. Appl. No. 17/571,940, filed Jan. 10, 2022.

Gilmore et al., U.S. Appl. No. 17/571,969, filed Jan. 10, 2022.

Gilmore et al., U.S. Appl. No. 17/205,991, filed Mar. 18, 2021.

Gilmore et al., U.S. Appl. No. 17/156,135, filed Jan. 22, 2021.

Gandhi et al., U.S. Appl. No. 17/156,135, filed Jan. 22, 2021.

Gandhi et al., U.S. Appl. No. 17/156,185, filed Jan. 22, 2021.

* cited by examiner

VIBRATION ISOLATION FOR BICYCLE SADDLE USING SUPER ELASTIC MATERIAL MEMBERS

FIELD

The subject matter described herein relates in general to saddles and, more particularly, to bicycle saddles.

BACKGROUND

A bicycle saddle, typically referred to as a bicycle seat, is designed to support a portion of a rider's body. The height of the saddle is often adjustable. The saddle can be made in various shapes and sizes. The saddle can be configured to provide some amount comfort for the rider, such as by including padding.

SUMMARY

In one respect, the present disclosure is directed to a vibration isolator. The vibration isolator can include a first landing. The vibration isolator can include a second landing spaced from the first landing. The vibration isolator can include a plunger located between the first landing and the second landing. The vibration isolator can include a first plurality of super elastic material members operatively connected to the first landing and to the plunger. The vibration isolator can include a second plurality of super elastic material members operatively connected to the plunger and to the second landing. The vibration isolator can be configured to exhibit a non-linear stiffness profile that includes a region of quasi-zero stiffness.

In another respect, the present disclosure is directed to a system for vibration isolation of a bicycle saddle. The system can include a bicycle saddle and a bicycle frame. The bicycle saddle can be operatively connected to the bicycle frame. The system can include a vibration isolator located within a portion of the bicycle frame. The vibration isolator can be operatively positioned with respect to the bicycle saddle. The vibration isolator can be configured to exhibit a non-linear stiffness profile that includes a region of quasi-zero stiffness. The vibration isolator can include one or more super elastic material members.

In still another respect, the present disclosure is directed to a vibration isolator. The vibration isolator can include a landing. The vibration isolator can include a plunger. The vibration isolator can include a plurality of super elastic material members. The plurality of super elastic material members can be operatively connected to the landing and to the plunger. The vibration isolator can be configured to exhibit a non-linear stiffness profile that includes a region of quasi-zero stiffness.

DETAILED DESCRIPTION

Figure 1:
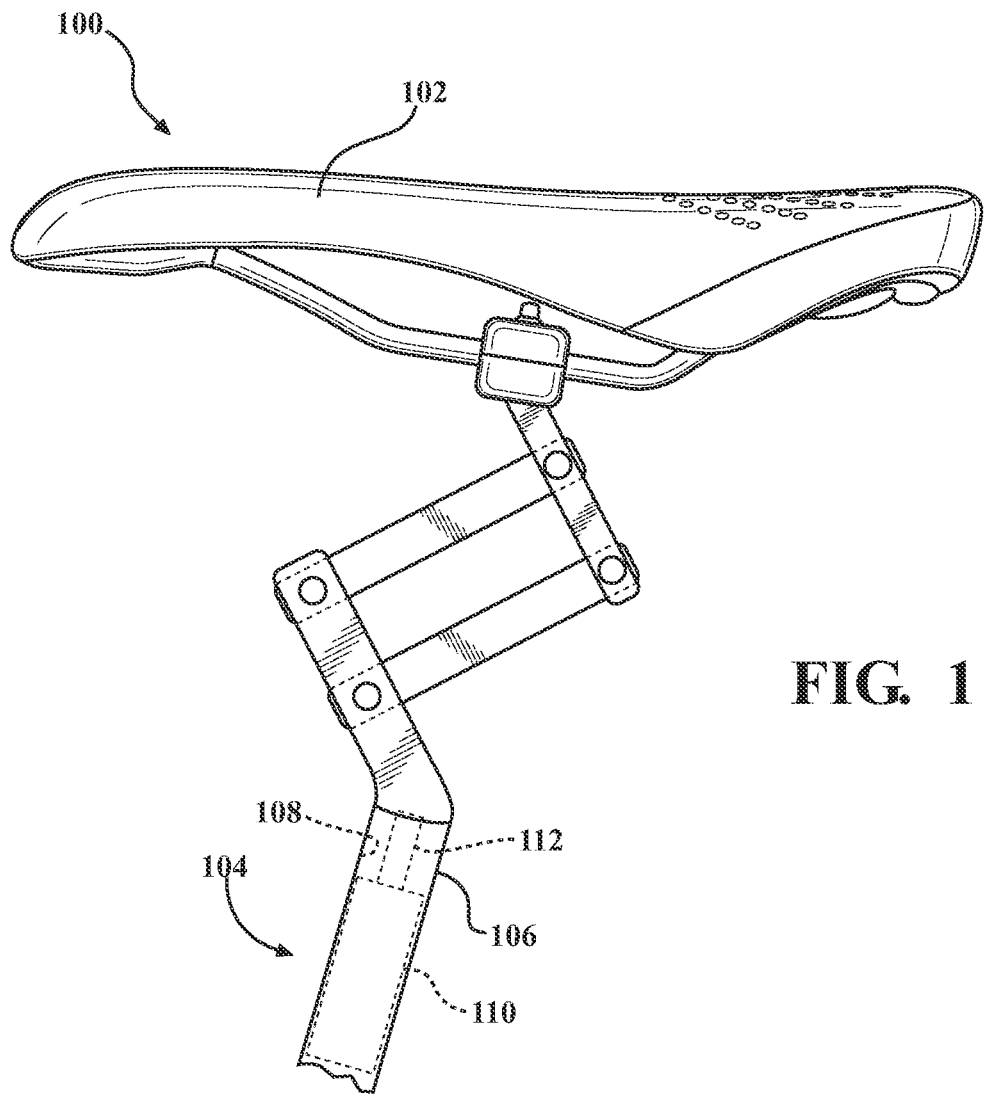
FIG. 1 is an example of a portion of a bicycle.
Figure 2:
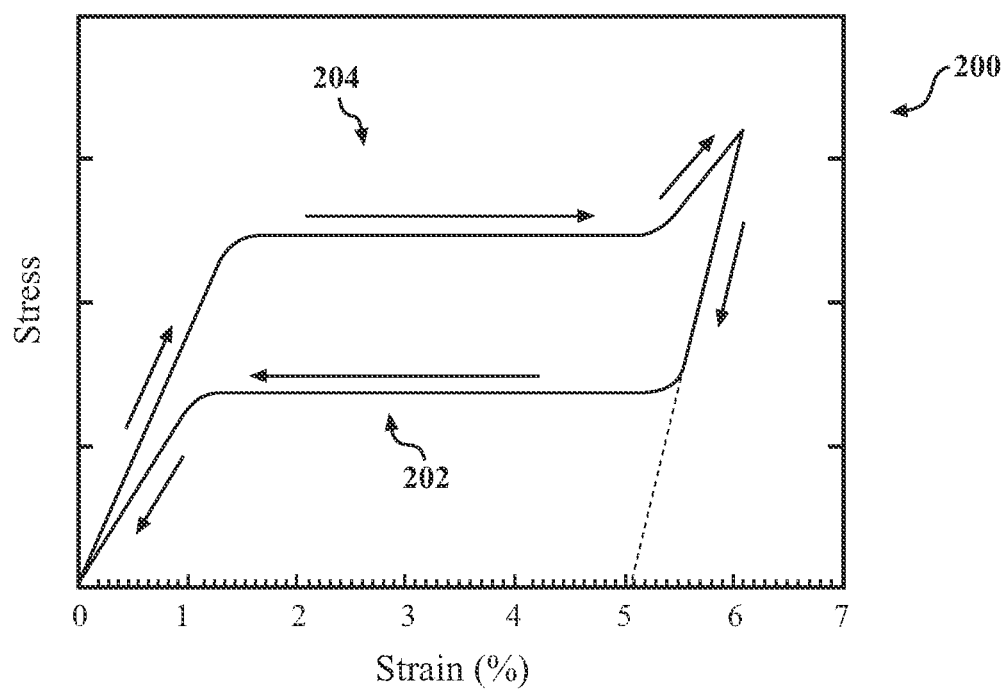
FIG. 2 is an example of a stress-strain curve for a super elastic material.

When in use, a bicycle may be driven over rough or otherwise non-smooth surfaces. As a result, vibrations may be transmitted to the bicycle seat or saddle. These vibrations can cause rider discomfort and/or reduce ride quality. According to arrangements described herein, a vibration isolator and a system can be configured to manage vibrations and/or forces that may be encountered during bicycle use.

A vibration isolator can be configured to exhibit a non-linear stiffness profile. The non-linear stiffness profile can include a region of quasi-zero stiffness. The vibration isolator can include or more super elastic material members. The vibration isolator can be used in connection with a system. In such case, the vibration isolator can be located within a portion of a bicycle frame. The vibration isolator can be operatively positioned with respect to the bicycle saddle.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-11, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of a portion of a bicycle 100 is shown. While arrangements described herein will be made with respect to a bicycle, it will be understood that arrangements described herein can be used in connection with various devices that include a seat or saddle. For instance, arrangements described herein can be used in connection with any powered or non-powered vehicle, including, for example, a unicycle, a motorcycle, or a tricycle.

The bicycle 100 can include a saddle 102, which may also be referred to as a seat. The saddle 102 can be designed to support a portion of a rider's body. The saddle 102 can provide cushioning and/or comfort to a user. The saddle 102 can be any type of saddle, now known or later developed.

The saddle 102 can be operatively connected to a frame 104 of the bicycle in any suitable manner, now known or later developed. In one or more arrangements, the saddle 102 can be operatively connected to a seat post 106. The seat post 106 can be a tubular structure. In some arrangements, at least a portion of the seat post 106 can be hollow. In such case, the seat post 106 can have an inner peripheral surface 108. The term "operatively connected," as used throughout this description, can include direct or indirect connections, including connections without direct physical contact.

A vibration isolator 110 can be operatively positioned to reduce vibrations acting upon the saddle 102. The vibration isolator 110 can be provided in any suitable location. In one or more arrangements, the vibration isolator 110 can be located within the hollow interior of the seat post 106. In some arrangements, the vibration isolator 110 can frictionally engage the inner peripheral surface 108 of the seat post 106. In some arrangements, the vibration isolator 110 can be operatively connected to the seat post 106. For instance, the vibration isolator 110 can be operatively connected to the seat post 106 by one or more fasteners, one or more welds, one or more adhesives, and/or one or more forms of mechanical engagement, or any combination thereof. The vibration isolator 110 can be operatively positioned with respect to an engaging structure, such as a pin 112, of the saddle 102 or other structure operatively connected to the saddle 102. In some arrangements, the pin 112 can directly contact the vibration isolator 110. In some arrangements, the pin 112 can be spaced from the vibration isolator 110.

In use, the structure above the pin 112 in FIG. 1 (e.g., a four-bar linkage or other structure) can push downwardly on the pin 112. As a result, the pin can push downwardly on the vibration isolator 110. In some arrangements, the structure and the pin 112 can be separate structures. In other arrangements, the structure and the pin 112 can be operatively connected to each other or can be a unitary structure.

It should be noted that, while the arrangements shown in FIG. 1 include a single vibration isolator 110, it will be appreciated that there can be a plurality of vibration isolators 110. In such case, the plurality of vibration isolators 110 can be arranged in any suitable manner. For instance, the plurality of vibration isolators 110 can be stacked end to end within the post 106. When there is a plurality of vibration isolators 110, the vibration isolators 110 can be substantially identical to each other, or one or more of the vibration isolators 110 can be different from the other vibration isolators 110 in one or more respects.

The vibration isolator 110 can include one or more super elastic material members. The super elastic material member(s) can be made of any suitable super elastic material. One example of a super elastic material is Adrena-Line™, which is available from Miga Motor Company, Silverton, Oreg. Another example of a super elastic material is Furukawa Ni—Ti Alloy, which is available from Furukawa Techno Material Co., Ltd., Kanagawa, Japan. In other examples, the super elastic material member(s) can be a shape memory alloy.

A super elastic material is a material that exhibits two primary properties under certain conditions: super elasticity and quasi-zero stiffness. These properties are depicted in the stress-strain curve 200 shown in FIG. 2. Super elasticity refers to the ability of the super elastic material to substantially regain its original shape when an applied stress, load, and/or force, is removed. For example, the super elastic recovery region 202 of the stress-strain curve 200 shows the super elastic material returning to a zero-stress state after unloading of an applied stress. Quasi-zero stiffness refers to a region of the stress-strain curve 200 for super elastic materials that is substantially flat. In the quasi-zero stiffness region 204 of the stress-strain curve 200, the stiffness becomes very low (for example, zero or substantially zero), which allows for good vibration isolation. When the super elastic material member(s) operate in the quasi-zero stiffness region 204, the transfer of vibrations from the bicycle to the saddle can be substantially reduced. In this way, the super elastic material member(s) can act as vibration isolators. The super elastic material member(s) would exhibit a similar profile on a force-deflection curve. In the quasi-zero stiffness region, the force-deflection curve can become substantially flat.

While the super elastic material member(s) can have any suitable form. For instance, the super elastic material member(s) can take the form of wires, cables, tubes, and/or other structures, just to name a few examples. Additionally or alternatively, the super elastic material member(s) may include an insulating coating.

The vibration isolator 110 can have various configurations, some of which will be described herein in connection with FIGS. 3-6. Each of these configurations will be described in turn below.

Figure 3A:
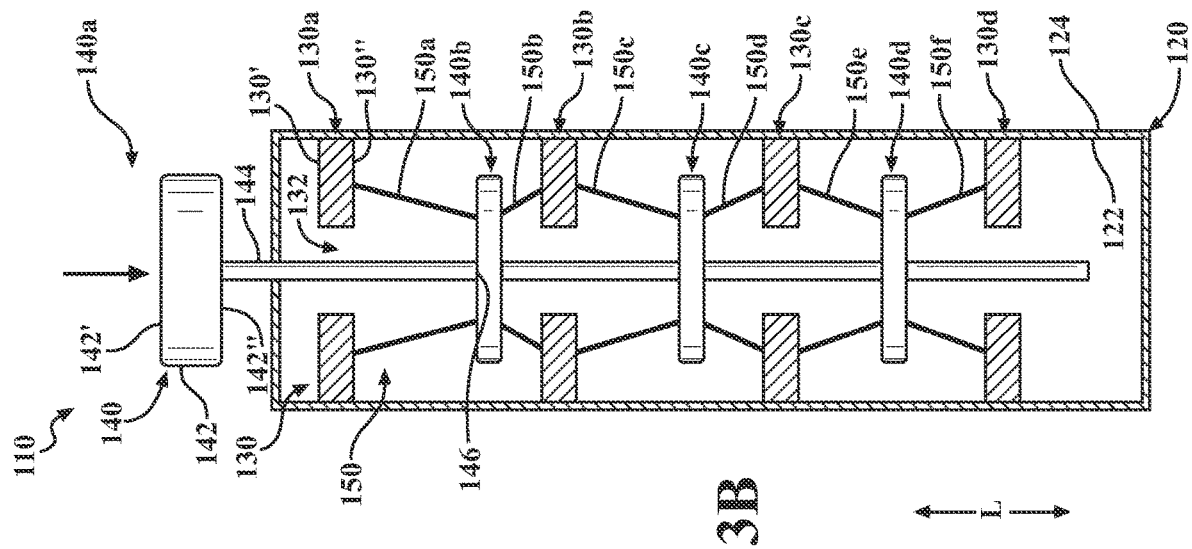
FIG. 3A is a cross-sectional view of a first example of an isolator for a bicycle saddle, showing a non-activated state.
Figure 3B:
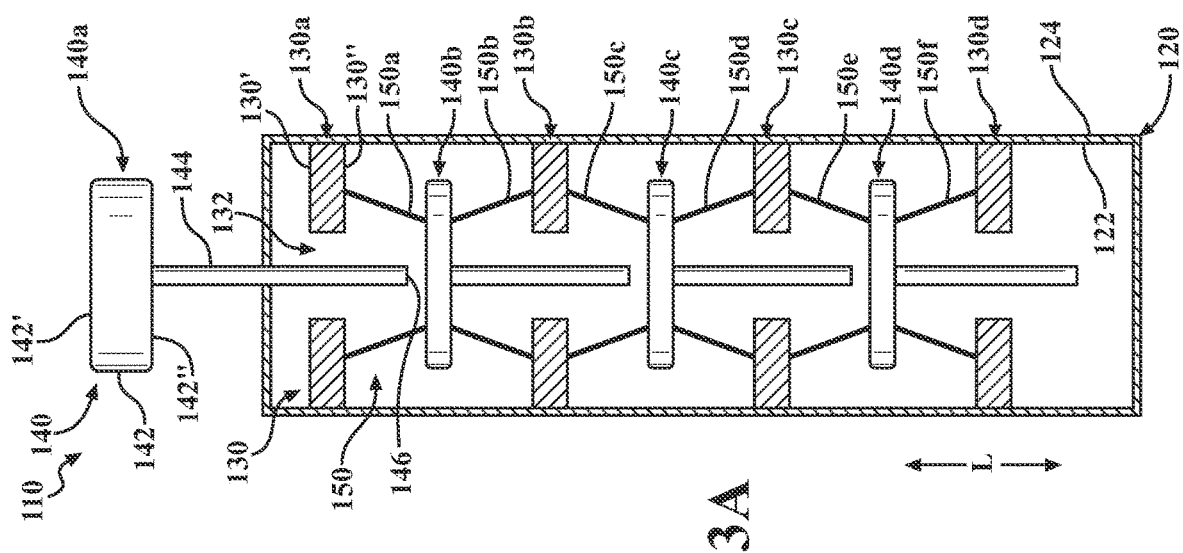
FIG. 3B is a cross-sectional view of the first example of an isolator for a bicycle saddle, showing an activated state.

Referring to FIGS. 3A-3B, a first example of the vibration isolator 110 is shown. The vibration isolator 110 can include an outer housing 120. The outer housing 120 can have any suitable size, shape, and/or configuration. In one or more arrangements, the outer housing 120 can be substantially cylindrical. The outer housing 120 can be hollow. The outer housing 120 can have an inner peripheral surface 122 and an outer peripheral surface 124. The outer housing 120 can be made of any suitable material, including, for example, metals or plastics.

The vibration isolator 110 can include one or more landings 130. The landings 130 can be operatively connected to the outer housing 120. For example, the landings 130 can be operatively connected to the inner peripheral surface 122 of outer housing 120 by one or more fasteners, one or more welds, one or more adhesives, and/or one or more forms of mechanical engagement, or any combination thereof. The landings 130 can be fixed landings in that they do not move. In some arrangements, the landings 130 can be fixed landings at least in that they do not move in the longitudinal direction L of the vibration isolator 110 (e.g., the top to bottom direction of the page in FIGS. 3A and 3B).

The landings 130 can have any suitable form. For instance, in one or more arrangements, the landings 130 can be substantially cylindrical in conformation. In some arrangements, one or more of the landings 130. Alternatively, one or more of the landings 130 can be made of a plurality of segments. The landings can define a central aperture 132.

The landings 130 can have an upper side 130' and a lower side 130". It will be appreciated that the terms "upper" and "lower" are made with respect to the orientation of the vibration isolator 110 in FIGS. 3A-3B. However, it will be understood that these terms are used for convenience to facilitate the discussion and are not intended to be limiting.

The landings 130 can be substantially identical to each other. Alternatively, one or more of the landings 130 can be different from the other landings in one or more respects. The landings 130 can be substantially equally spaced from each other. Alternatively, one or more of the landings 130 may be non-equally spaced. The landings 130 can be made of any suitable material, including, for example, metals or plastics.

The vibration isolator 110 can include any suitable number of landings 130. In the arrangements shown in FIGS. 3A-3B, there can be four landings. However, it will be appreciated that there can be a greater or fewer number of landings. To facilitate the discussion, the uppermost landing in FIG. 3A will be referred to as the first landing 130*a*. Continuing downwardly in the longitudinal direction L, the next landing will be referred to as the second landing 130*b*. Continuing further downwardly in the longitudinal direction L, the next landing will be referred to as the third landing 130*c*. The lowermost landing will be referred to as the fourth landing 130*d*.

The vibration isolator 110 can include a plurality of plungers 140. The plungers 140 can be any movable structure and can have any suitable configuration. For instance, in one or more arrangements, one or more of the plungers 140 can include a head 142 and a shaft 144. The head 142 can include an upper side 142' and a lower side 142". The shaft 144 can extend from the head 142 and, more particularly, from the lower side 142" of the head 142. The shaft 144 can extend to a distal end 146.

The vibration isolator 110 can include any suitable number of plungers 140. In the arrangements shown in FIGS. 3A-3B, there can be four plungers. However, it will be appreciated that, in some arrangements, there can be a greater or fewer number of plungers. To facilitate the discussion, the uppermost plunger in FIG. 3A will be referred to as the first plunger 140*a*. Continuing downwardly in the longitudinal direction L, the next plunger will be referred to as the second plunger 140*b*. Continuing further downwardly in the longitudinal direction L, the next plunger will be referred to as the third plunger 140*c*. The lowermost plunger will be referred to as the fourth plunger 140*d*.

The head 142 can have any suitable size, shape, and/or configuration. The shafts 144 can have any suitable size, shape, and/or configuration. The head 142 and the shaft 144 can be a unitary structure, or they can be separate pieces subsequently joined together. In some arrangements, the head 142 can be substantially circular, rectangular, polygonal, or triangular in conformation. In some arrangements, the shaft 144 can have a substantially circular, rectangular, polygonal, or triangular cross-sectional shape.

In some arrangements, the shafts 144 of the plungers 140 can be substantially aligned with each other within the vibration isolator 110. In some arrangements, one or more of the shafts 144 can be offset from the other shafts 144.

The plungers 140 can be substantially identical to each other. Alternatively, one or more of the plungers 140 can be different from the other plungers 140 in one or more respects, including, for example, head width, head shape, head thickness, shaft length, shaft diameter or width, and/or shaft cross-sectional shape. In some arrangements, the head 142 and a portion of the shaft 144 of the first plunger 140*a* can extend outside of the outer housing 120. This exposed portion of the first plunger 140*a* can engage with the engaging structure (e.g., the pin 112 in FIG. 1). The plungers 140 can be made of any suitable material, including, for example, metals or plastics.

As noted above, the vibration isolator 110 can include a plurality of super elastic material members 150. The super elastic material member(s) 150 can be any suitable super elastic material, now known or later developed. The super elastic material member(s) 150 can be any of the super elastic materials described herein.

The super elastic material member(s) 150 can be arranged in any suitable manner. For instance, one or more super elastic material members 150 can be operatively connected between the first landing 130*a* and the second plunger 140*b*. As an example, the super elastic material member(s) 150 can be operatively connected between lower side 130" of the first landing 130*a* and the upper side 142' of the head 142 of the second plunger 140*b*. These super elastic material member(s) 150 will be referred to as the first super elastic material member(s) 150*a*.

One or more super elastic material members 150 can be operatively connected between the second plunger 140*b* and the second landing 130*b*. As an example, the super elastic material member(s) 150 can be operatively connected between the lower side 142" of the head 142 of the second plunger 140*b* and the upper side 130' of the second landing 130*b*. These super elastic material member(s) 150 will be referred to as the second super elastic material member(s) 150*b*.

One or more super elastic material members 150 can be operatively connected between the second landing 130*b* and the third plunger 140*c*. As an example, the super elastic material member(s) 150 can be operatively connected between lower side 130" of the second landing 130*b* and the upper side 142' of the head 142 of the third plunger 140*c*. These super elastic material member(s) 150 will be referred to as the third super elastic material member(s) 150*c*.

One or more super elastic material members 150 can be operatively connected between the third plunger 140*c* and the third landing 130*c*. As an example, the super elastic material member(s) 150 can be operatively connected between the lower side 142" of the head 142 of the third plunger 140*c* and the upper side 130' of third landing 130*c*. These super elastic material member(s) 150 will be referred to as the fourth super elastic material member(s) 150*d*.

One or more super elastic material members 150 can be operatively connected between the third landing 130*c* and the fourth plunger 140*d*. As an example, the super elastic material member(s) 150 can be operatively connected between lower side 130" of the third landing 130*c* and the upper side 142' of the head 142 of the fourth plunger 140*d*. These super elastic material member(s) 150 will be referred to as the fifth super elastic material member(s) 150*e*.

One or more super elastic material members 150 can be operatively connected between the fourth plunger 140*d* and the fourth landing 130*d*. As an example, the super elastic material member(s) 150 can be operatively connected between the lower side 142" of the head 142 of the fourth plunger 140*d* and the upper side 130' of fourth landing 130*d*. These super elastic material member(s) 150 will be referred to as the sixth super elastic material member(s) 150*f*.

Any suitable manner of operative connection can be provided between the super elastic material members 150 and the respective landings 130 and plungers 140. For example, the operative connection can include one or more fasteners, one or more welds, one or more brazes, one or more adhesives, and/or one or more forms of mechanical engagements, or any combination thereof.

Each of the first super elastic material member(s), the second super elastic material member(s), the third super elastic material member(s), the fourth super elastic material member(s), the fifth super elastic material member(s), and the sixth super elastic material member(s) can have any suitable quantity of the super elastic material members 150. In some arrangements, each of the first super elastic material member(s) 150a, the second super elastic material member(s) 150b, the third super elastic material member(s) 150c, the fourth super elastic material member(s) 150d, the fifth super elastic material member(s) 150e, and the sixth super elastic material member(s) 150f can include the same number of super elastic material members 150. In some arrangements, the quantity of the super elastic material member(s) in at least one of the first super elastic material member(s) 150a, the second super elastic material member(s) 150b, the third super elastic material member(s) 150c, the fourth super elastic material member(s) 150d, the fifth super elastic material member(s) 150e, and the sixth super elastic material member(s) 150f can be different.

In some arrangements, the super elastic material members 150 can be angled relative to the longitudinal direction L of the vibration isolator 110. Thus, the super elastic material members 150 can be angled relative to the shafts 144 of the plungers 140. The super elastic material members 150 can extend at any angle relative to the longitudinal direction L, such as from about 10 degrees, about 15 degrees, about 20 degrees, about 25 degrees, about 30 degrees, about 35 degrees, about 40 degrees, about 45 degrees, about 50 degrees, about 55 degrees, about 60 degrees, about 65 degrees, about 70 degrees, about 75 degrees, or about 80 degrees, just to name a few possibilities. The super elastic material members 150 can all extend at substantially the same angle relative to the longitudinal direction L, or one or more of the super elastic material members 150 can extend at a different angle relative to the longitudinal direction L from the other the super elastic material members 150.

In some arrangements, the first super elastic material member(s) 150a, the third super elastic material member(s) 150c, and/or the fifth super elastic material member(s) 150e can be substantially parallel to each other. In some arrangements, the second super elastic material member(s) 150b, the fourth super elastic material member(s) 150d, and/or the sixth super elastic material member(s) 150f can be substantially parallel to each other.

The super elastic material members 150 can be distributed in any suitable manner. For instance, in at least one of the first super elastic material member(s) 150a, the second super elastic material member(s) 150b, the third super elastic material member(s) 150c, the fourth super elastic material member(s) 150d, the fifth super elastic material member(s) 150e, and the sixth super elastic material member(s) 150f, the respective super elastic material members 150 can be substantially equally spaced. In other arrangements, one or more of the super elastic material members 150 may be non-equally spaced relative to the other super elastic material members 150 in at least one of the first super elastic material member(s) 150a, the second super elastic material member(s) 150b, the third super elastic material member(s) 150c, the fourth super elastic material member(s) 150d, the fifth super elastic material member(s) 150e, and the sixth super elastic material member(s) 150f.

In some arrangements, the first super elastic material member(s) 150a, the second super elastic material member(s) 150b, the third super elastic material member(s), the fourth super elastic material member(s), the fifth super elastic material member(s), and the sixth super elastic material member(s) can be distributed in substantially the same manner so that the super elastic material members are substantially aligned. However, in some arrangements, the super elastic material member(s) 150 of at least one of the first super elastic material member(s), the second super elastic material member(s), the third super elastic material member(s), the fourth super elastic material member(s), the fifth super elastic material member(s), or the sixth super elastic material member(s) can be offset from the other.

In some arrangements, the super elastic material member(s) 150 can be pre-stretched to a quasi-zero stiffness region of the non-linear stiffness profile. In such case, when stretched or becoming less stretched during expected operational loads, the super elastic material member(s) 150 can remain in the quasi-zero stiffness region of the non-linear stiffness profile. In some arrangements, the super elastic material member(s) 150 can be stretched or become less stretched to be in or remain in a quasi-zero stiffness region of the non-linear stiffness profile when loaded (e.g., when the plungers move).

FIG. 3A shows the vibration isolator 110 in a non-activated configuration, and FIG. 3B shows the vibration isolator 110 in an activated configuration. In the non-activated configuration, the distal ends 146 of the plungers 140 can be spaced a distance from the respective heads 142 of the neighboring plungers 140.

When a load is imposed upon the head 142 of the first plunger 140a, such as from the pin 112, the first plunger 140a can be move downwardly. Eventually, the distal end 146 of the first plunger 140a can come into contact with the upper side 142' of the head 142 of the second plunger 140b. As the first plunger 140a moves further downwardly, the head 142 of the second plunger 140b will be moved downwardly. As a result, the first super elastic material member(s) 150a can be stretched, the second super elastic material member(s) 150b can be relaxed or less stretched (while remaining in tension). The process can continue with the other plungers 140 and the super elastic material members 150.

Figure 8:
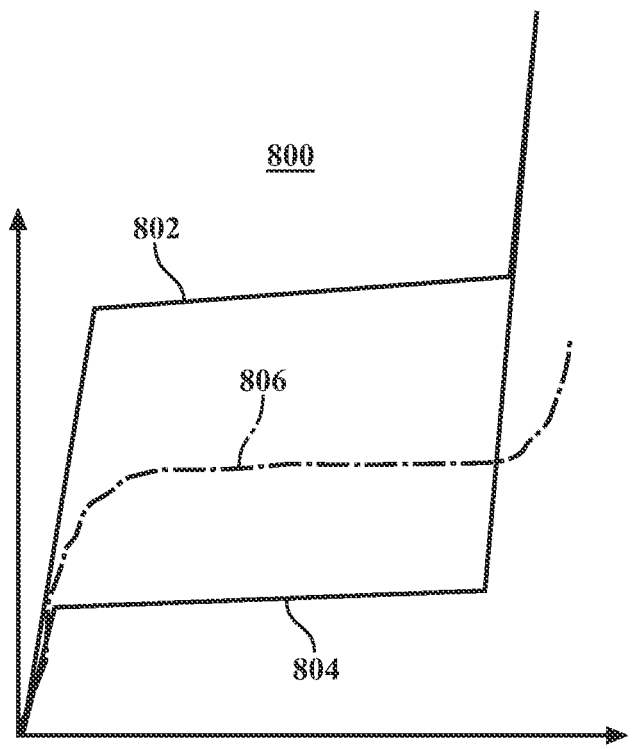
FIG. 8 is an example of a force versus deflection graph, showing the counterbalancing effect of different super elastic material members.

It will be appreciated that some of the super elastic material members 150 can be stretched (e.g., the first super elastic material member(s) 150a, the third super elastic material members 150c, and/or the fifth super elastic material members 150e), and some of the super elastic material members 150 can become relaxed or less stretched (e.g., the second super elastic material member(s) 150b, the fourth super elastic material member(s) 150d, and/or the sixth super elastic material member(s) 150f) while remaining in tension. However, the vibration isolator 110 can remain in the quasi zero stiffness region of the non-linear stiffness profile. For example, the changes in the stiffness characteristics of the first super elastic material member(s) 150a and the second super elastic material member(s) 150b can at least partially counterbalance each other. In some arrangements, the changes in the stiffness characteristics of the first super elastic material member(s) 150a and the second super elastic material member(s) 150b can substantially fully counterbalance each other. An example of this effect is shown in FIG. 8. FIG. 8 presents a force-deflection graph 800. The stretching of some of the super elastic material members 150 can change the stiffness characteristics to the curve 802, and the reduced stretching of some of the super elastic material members 150 can be change the stiffness characteristics to the curve 804. Thus, these changes can offset or counterbalance each other, such that, overall, the vibration isolator 110 has a stiffness represented by the curve 806. Thus, the vibration isolator 110 can manage the vibrations that may occur through usage of the bicycle 100.

Figure 9:
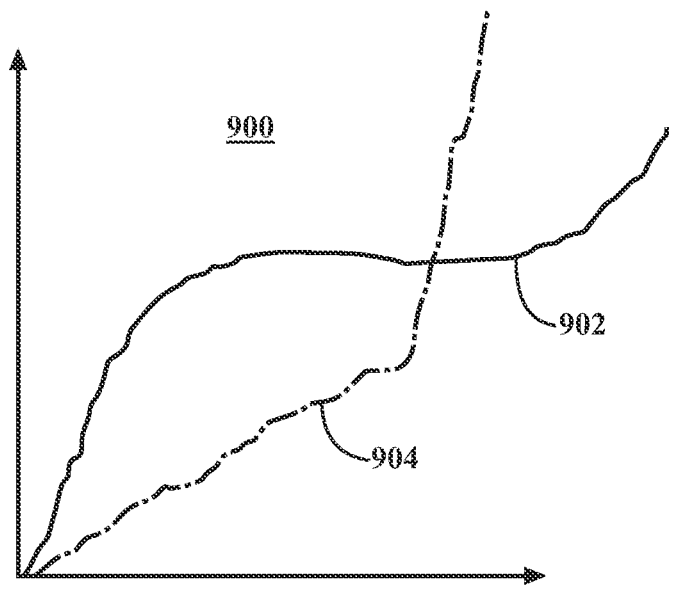
FIG. 9 is an example of a force versus deflection graph, showing the difference in curves for super elastic material members and linear springs.

It will be appreciated that the non-linear stiffness profile of the vibration isolator 110 according to arrangements described herein can provide improved vibration isolation performance compared to a linear spring type system. A general representation of the performance differences is shown in FIG. 9, which presents a force versus deflection graph 900. One curve 902 represents the performance of a vibration isolator according to arrangements described herein. Another curve 904 represents the performance of a vibration isolator with a linear spring. The curve 902 include a quasi-zero stiffness region, but the curve 904 does not.

Figure 4B:
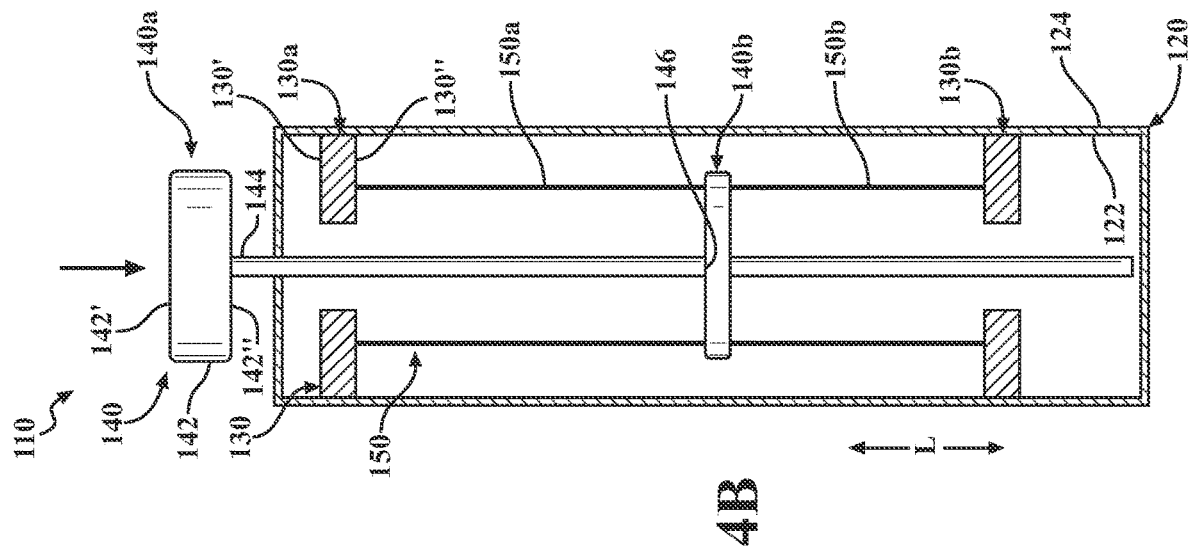
FIG. 4B is a cross-sectional view of the second example of an isolator for a bicycle saddle, showing an activated state.
Figure 4A:
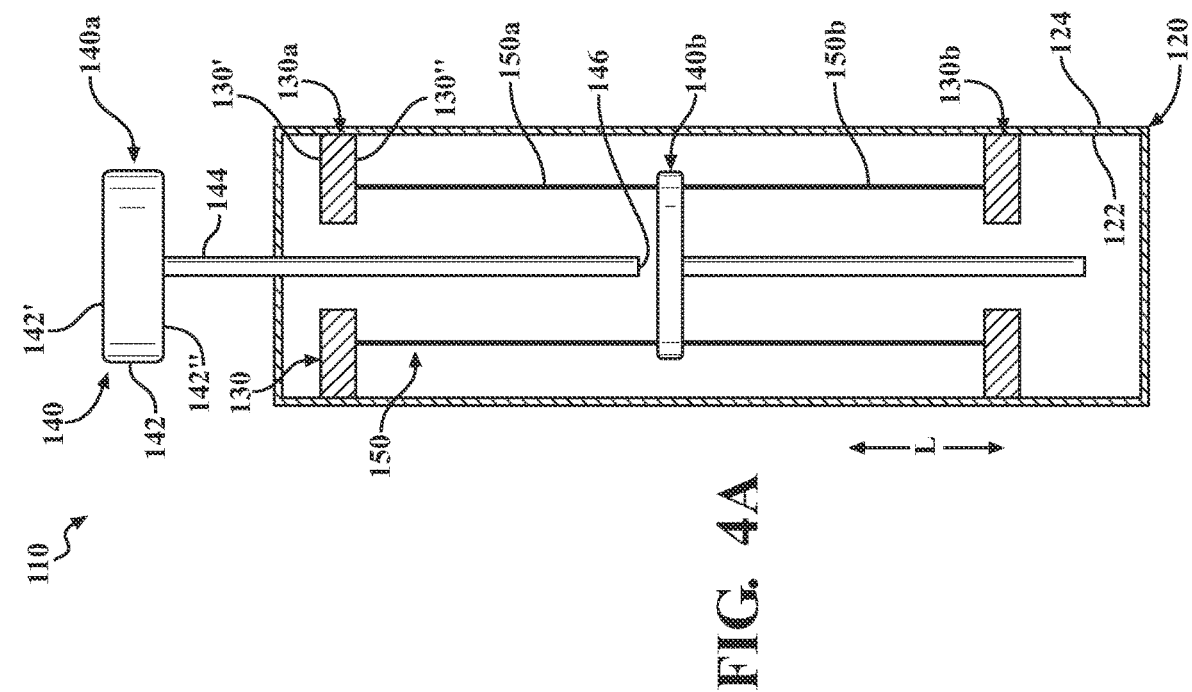
FIG. 4A is a cross-sectional view of a second example of an isolator for a bicycle saddle, showing a non-activated state.

Referring to FIGS. 4A-4B, another example of the vibration isolator 110 is shown. To streamline the discussion, the above description of the outer housing 120, the landings 130, the plungers 140, and the super elastic material members 150 applies equally here and will not be repeated. Also, the reference numbers used in FIGS. 3A-3B are used for the like structures in FIGS. 4A-4B.

In FIGS. 4A-4B, the landings 130 include the first landing 130a and the second landing 130b. The plungers 140 include the first plunger 140a and the second plunger 140b. The super elastic material members 150 can include the first super elastic material member(s) 150a and the second super elastic material member(s) 150b.

The super elastic material members 150 can extend substantially parallel to the longitudinal direction L. Thus, the super elastic material members 150 can be substantially parallel to the shafts 144 of the plungers 140. The super elastic material members 150 can be substantially parallel to each other.

The super elastic material members 150 can be distributed in any suitable manner. For instance, in at least one of the first super elastic material member(s) 150a and the second super elastic material member(s) 150b, the respective super elastic material members 150 can be substantially equally spaced. In other arrangements, one or more of the super elastic material members 150 may be non-equally spaced relative to the other super elastic material members 150 in at least one of the first super elastic material member(s) 150a and/or the second super elastic material member(s) 150b.

In some arrangements, the first super elastic material member(s) 150a and the second super elastic material member(s) 150b can be distributed in substantially the same manner so that the super elastic material members are substantially aligned. However, in some arrangements, the super elastic material member(s) 150 of at least one of the first super elastic material member(s) 150a and the second super elastic material member(s) 150b can be offset from the other In some arrangements, the super elastic material member(s) 150 can be pre-stretched to a quasi-zero stiffness region of the non-linear stiffness profile. In such case, when stretched or become less stretched during expected operational loads, the super elastic material member(s) 150 can remain in the quasi-zero stiffness region of the non-linear stiffness profile. In some arrangements, the super elastic material member(s) 150 can be stretched or becomes less stretched to a quasi-zero stiffness region of the non-linear stiffness profile when loaded (e.g., when the plungers 140 move).

FIG. 4A shows the vibration isolator 110 in a non-activated configuration, and FIG. 4B shows the vibration isolator 110 in an activated configuration. In the non-activated configuration, the distal ends 146 of the plungers 140 can be spaced a distance from the respective heads 142 of the neighboring plungers 140.

When a load is imposed upon the head 142 of the first plunger 140a, such as from the pin 112, the first plunger 140a can be move downwardly. Eventually, the distal end 146 of the first plunger 140a can come into contact with the upper side 142' of the head 142 of the second plunger 140b. As the first plunger 140a moves further downwardly, the head 142 of the second plunger 140b will be moved downwardly.

As a result, the first super elastic material member(s) 150a can be stretched, the second super elastic material member(s) 150b can become less stretched. However, the vibration isolator 110 can remain in the quasi zero stiffness region of the non-linear stiffness profile. For example, the changes in the stiffness characteristics of the first super elastic material member(s) 150a and the second super elastic material member(s) 150b can at least partially counterbalance each other. In some arrangements, the changes in the stiffness characteristics of the first super elastic material member(s) 150a and the second super elastic material member(s) 150b can substantially fully counterbalance each other.

Figure 5A:
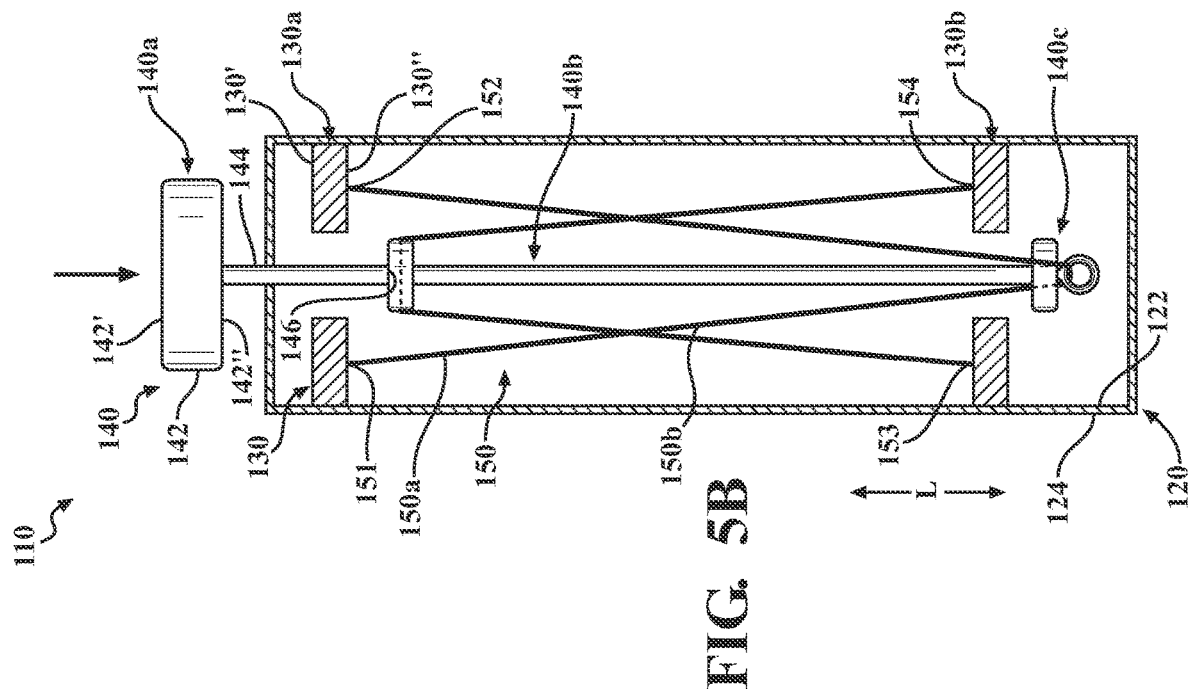
FIG. 5A is a cross-sectional view of a third example of an isolator for a bicycle saddle, showing a non-activated state.
Figure 5B:
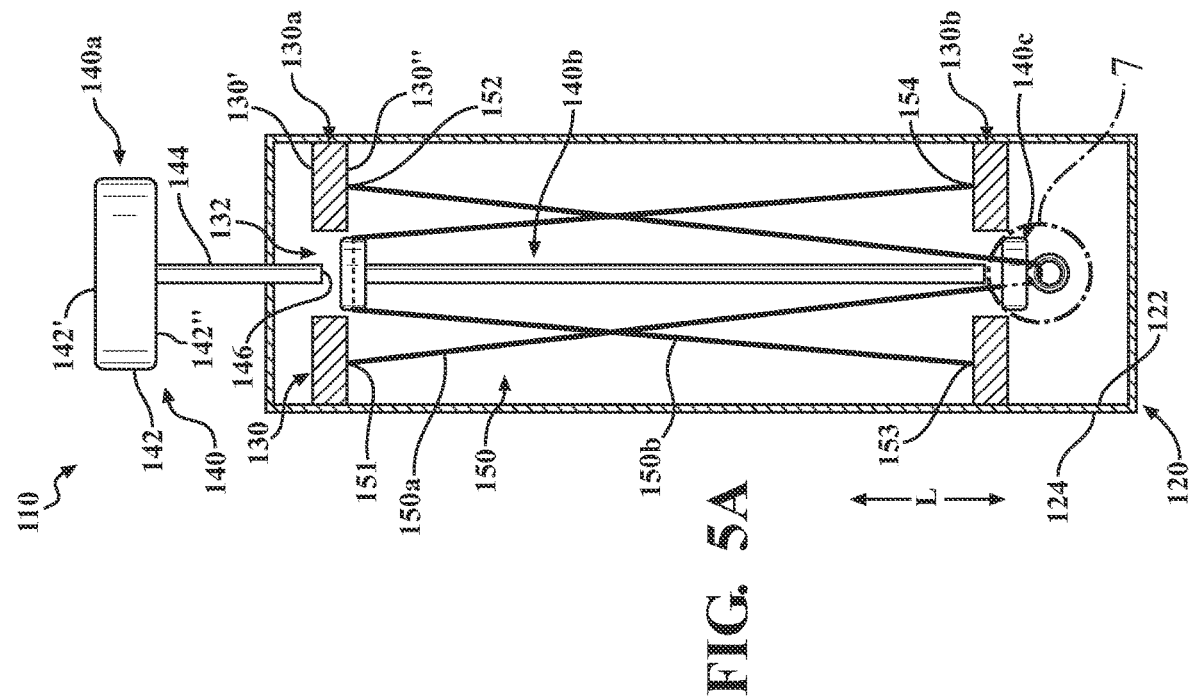
FIG. 5B is a cross-sectional view of the third example of an isolator for a bicycle saddle, showing an activated state.

Referring to FIGS. 5A-5B, yet another example of the vibration isolator 110 is shown. To streamline the discussion, the above description of the outer housing 120, the landings 130, the plungers 140, and the super elastic material members 150 in connection with FIGS. 3A-3B applies equally here and will not be repeated. Also, the reference numbers used in FIGS. 3A-3B are used for the like structures in FIGS. 5A-5B.

In FIGS. 5A-5B, the landings 130 include the first landing 130a and the second landing 130b. The plungers 140 include the first plunger 140a, the second plunger 140b, and the third plunger 140c. In the arrangement shown, the third plunger 140c can include head 142 without an associated shaft. The super elastic material members 150 can include the first super elastic material member(s) 150a and the second super elastic material member(s) 150b.

The vibration isolator can include a plurality of super elastic material members. The super elastic material member(s) can be any suitable super elastic material, now known or later developed. The super elastic material member(s) can be any of the super elastic materials described herein.

In this particular example, there can be two super elastic material members 150—a first super elastic material member 150a and a second super elastic material member 150b. However, it will be appreciated that there can be more than two super elastic material members 150.

The super elastic material members 150a, 150b can be substantially identical to each other. Alternatively, the super elastic material members 150a, 150b can be different in one or more respects, including, for example, length, diameter, cross-sectional shape, amount of pre-stretching, and/or material.

The super elastic material members 150 can arranged in any suitable manner. For instance, the first super elastic material member 150a can have a first end 151 and second end 152. The first and second ends 151, 152 can be operatively connected to the first landing 130a. For instance, the first and second ends 151, 152 can be operatively connected to the lower side 130" of the first landing 130a on opposite sides of the central aperture 132. Any suitable manner of operative connection can be provided, including, for example, one or more fasteners, one or more welds, one or more brazes, one or more adhesives, and/or one or more forms of mechanical engagements, or any combination thereof.

Figure 7:
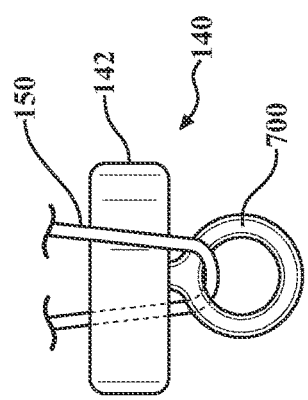
FIG. 7 is an example of an operative connection between the super elastic material member and a landing.

The first super elastic material member 150a can extend downwardly from the first end 151. The first super elastic material member 150a can wrap about a portion of the third plunger 140c, such as the head 142 of the third plunger 140c. In some arrangements, the first super elastic material member 150a can be operatively connected to the third plunger 140c. For instance, as is shown in FIG. 7, the third plunger 140c can include a fastener, such as eye bolt 700, for operatively connecting the first super elastic material member 150a. The first super elastic material member 150a can pass through the opening in the eye bolt 700.

From there, the first super elastic material member 150a can extend upwardly to the second end 152. Thus, the first super elastic material member 150a can have a substantially parabolic configuration, as shown in FIG. 5A.

In one alternative arrangement, there may not be a third plunger 140c. In such case, the first super elastic material member 150a can wrap around the distal end 146 of the shaft 144 of the second plunger 140b.

The second super elastic material member 150b can have a first end 153 and second end 154. The first and second ends 153, 154 can be operatively connected to the second landing 130b. For instance, the first and second ends 153, 154 can be operatively connected to the upper side 130' of the second landing 130b on opposite sides of the central aperture 132. Any suitable manner of operative connection can be provided, including, for example, one or more fasteners, one or more welds, one or more brazes, one or more adhesives, and/or one or more forms of mechanical engagements, or any combination thereof.

The second super elastic material member 150b can extend upwardly from the first end 153. The second super elastic material member 150b can wrap about a portion of the second plunger 140b, such as the head 142 of the second plunger 140b. In some arrangements, the second super elastic material member 150b can be operatively connected to the second plunger 140b in any suitable manner, including in a manner shown in FIG. 7.

From there, the second super elastic material member 150b can extend downwardly to the second end 154. Thus, the second super elastic material member 150b can have a substantially parabolic configuration.

In some arrangements, the super elastic material members 150 can be pre-stretched to a quasi-zero stiffness region of the non-linear stiffness profile. In such case, when stretched or becoming less stretched during expected operational loads, the super elastic material members 150 can remain in the quasi-zero stiffness region of the non-linear stiffness profile. In some arrangements, the super elastic material members 150 can be stretched or become less stretched to a quasi-zero stiffness region of the non-linear stiffness profile when loaded (e.g., when the plungers 140 move).

FIG. 5A shows the vibration isolator 110 in a non-activated configuration, and FIG. 5B shows the vibration isolator 110 in an activated configuration. In the non-activated configuration, the distal ends 146 of the plungers 140 can be spaced a distance from the respective heads 142 of the neighboring plungers 140. However, in some arrangements, the distal ends 146 of the plungers can be adjacent to the respective heads 142 of the neighboring plungers 140.

When a load is imposed upon the head 142 of the first plunger 140a, such as from the pin 112, the first plunger 140a can be move downwardly in the longitudinal direction L. Eventually, the distal end 146 of the first plunger 140a can come into contact with the upper side 142' of the head 142 of the second plunger 140b. As the first plunger 140a moves further downwardly, the head 142 of the second plunger 140b will be moved downwardly.

As a result, the first super elastic material member(s) 150a can be stretched, the second super elastic material member(s) 150b can become less stretched. However, the vibration isolator 110 can remain in the quasi zero stiffness region of the non-linear stiffness profile. For example, the changes in the stiffness characteristics of the first super elastic material member(s) 150a and the second super elastic material member(s) 150b can at least partially counterbalance each other. In some arrangements, the changes in the stiffness characteristics of the first super elastic material member(s) 150a and the second super elastic material member(s) 150b can substantially fully counterbalance each other.

Figure 6B:
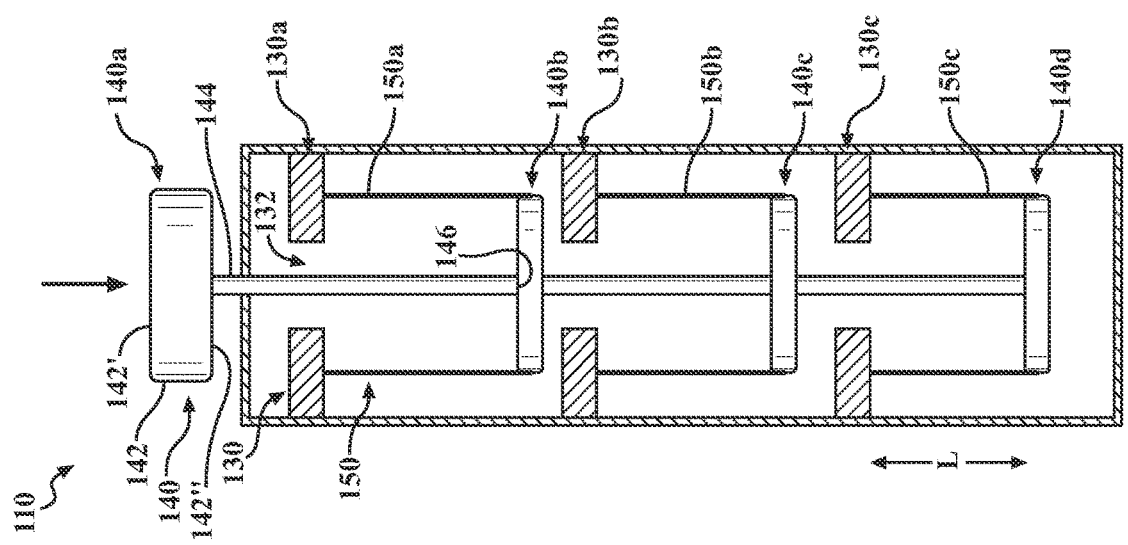
FIG. 6B is a cross-sectional view of the fourth example of an isolator for a bicycle saddle, showing an activated state.
Figure 6A:
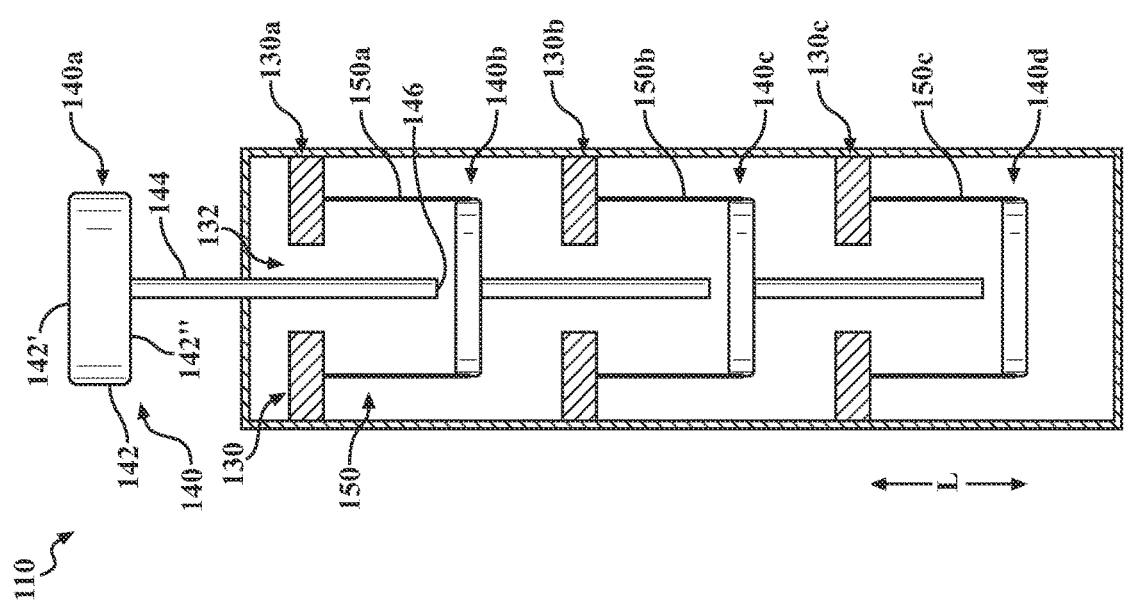
FIG. 6A is a cross-sectional view of a fourth example of an isolator for a bicycle saddle, showing a non-activated state.

Referring to FIGS. 6A-6B, still another example of the vibration isolator 110 is shown. To streamline the discussion, the above description of the outer housing 120, the landings 130, the plungers 140, and the super elastic material members 150 in FIGS. 3A-3B applies equally here and will not be repeated. Also, the reference numbers used in FIGS. 3A-3B are used for the like structures in FIGS. 6A-6B.

In FIGS. 6A-4B, the landings 130 include the first landing 130a, the second landing 130b, and the third landing 130c. The plungers 140 include the first plunger 140a, the second plunger 140b, and the third landing 130c. The super elastic material members 150 can include the first super elastic material member(s) 150a, the second super elastic material member(s) 150b, and the third super elastic material member(s) 150c.

The super elastic material members 150 can extend substantially parallel to the longitudinal direction L, or they can be angled (similar to the arrangements in FIGS. 3A-3B). Thus, the super elastic material members 150 can be substantially parallel to the shafts 144 of the plungers 140. The super elastic material members 150 can be substantially parallel to each other.

The super elastic material member(s) 150 can be arranged in any suitable manner. For instance, the first super elastic material members 150a can be operatively connected between the first landing 130a and the second plunger 140b. As an example, the first super elastic material member(s) 150a can be operatively connected between lower side 130" of the first landing 130a and the upper side 142' of the head 142 of the second plunger 140b.

The second super elastic material members 150b can be operatively connected between the second landing 130b and the third plunger 140c. As an example, the second super elastic material member(s) 150b can be operatively connected between lower side 130" of the second landing 130b and the upper side 142' of the head 142 of the third plunger 140c.

The third elastic material members 150c can be operatively connected between the third landing 130c and the fourth plunger 140d. As an example, the third super elastic material member(s) 150c can be operatively connected between lower side 130" of the third landing 130c and the upper side 142' of the head 142 of the fourth plunger 140d.

However, there are no super elastic material member(s) 150 operatively connecting the second plunger 140b and the second landing 130b. Further, there are no super elastic material member(s) 150 operatively connecting the third plunger 140c and the third landing 130c. Still further, there are no super elastic material member(s) 150 operatively connecting the fourth plunger 140d and the fourth landing or other structure located below the fourth plunger 140d.

In some arrangements, the super elastic material member(s) 150 can be pre-stretched to a quasi-zero stiffness region of the non-linear stiffness profile. In such case, when stretched during expected operational loads, the super elastic material member(s) 150 can remain in the quasi-zero stiffness region of the non-linear stiffness profile. In some arrangements, the super elastic material member(s) 150 can be stretched to a quasi-zero stiffness region of the non-linear stiffness profile when loaded (e.g., when the plungers 140 move downwardly).

FIG. 6A shows the vibration isolator 110 in a non-activated configuration, and FIG. 6B shows the vibration isolator 110 in an activated configuration. In the non-activated configuration, the distal ends 146 of the plungers 140 can be spaced a distance from the respective heads 142 of the neighboring plungers 140. However, in some arrangements, the distal ends 146 of the plungers 140 can be adjacent to the respective heads 142 of the neighboring plungers 140.

When a load is imposed upon the head 142 of the first plunger 140*a*, such as from the pin 112, the first plunger 140*a* can be move downwardly. Eventually, the distal end 146 of the first plunger 140*a* can come into contact with the upper side 142' of the head 142 of the second plunger 140*b*. As the first plunger 140*a* moves further downwardly, the head 142 of the second plunger 140*b* will be moved downwardly. As the first plunger 140*a* and the second plunger 140*b* continue to move downwardly, the distal end 146 of the second plunger 140*b* can contact the head 142 of the third plunger 140*c*. As the downward movement continues, the distal end 146 of the third plunger 140*c* can contact the fourth plunger 140*d*.

As a result, the first super elastic material member(s) 150*a*, the second super elastic material member(s) 150*b*, and the third super elastic material member(s) 150*c* can be stretched. However, the vibration isolator 110 can remain in or enter the quasi zero stiffness region of the non-linear stiffness profile.

Figure 10:
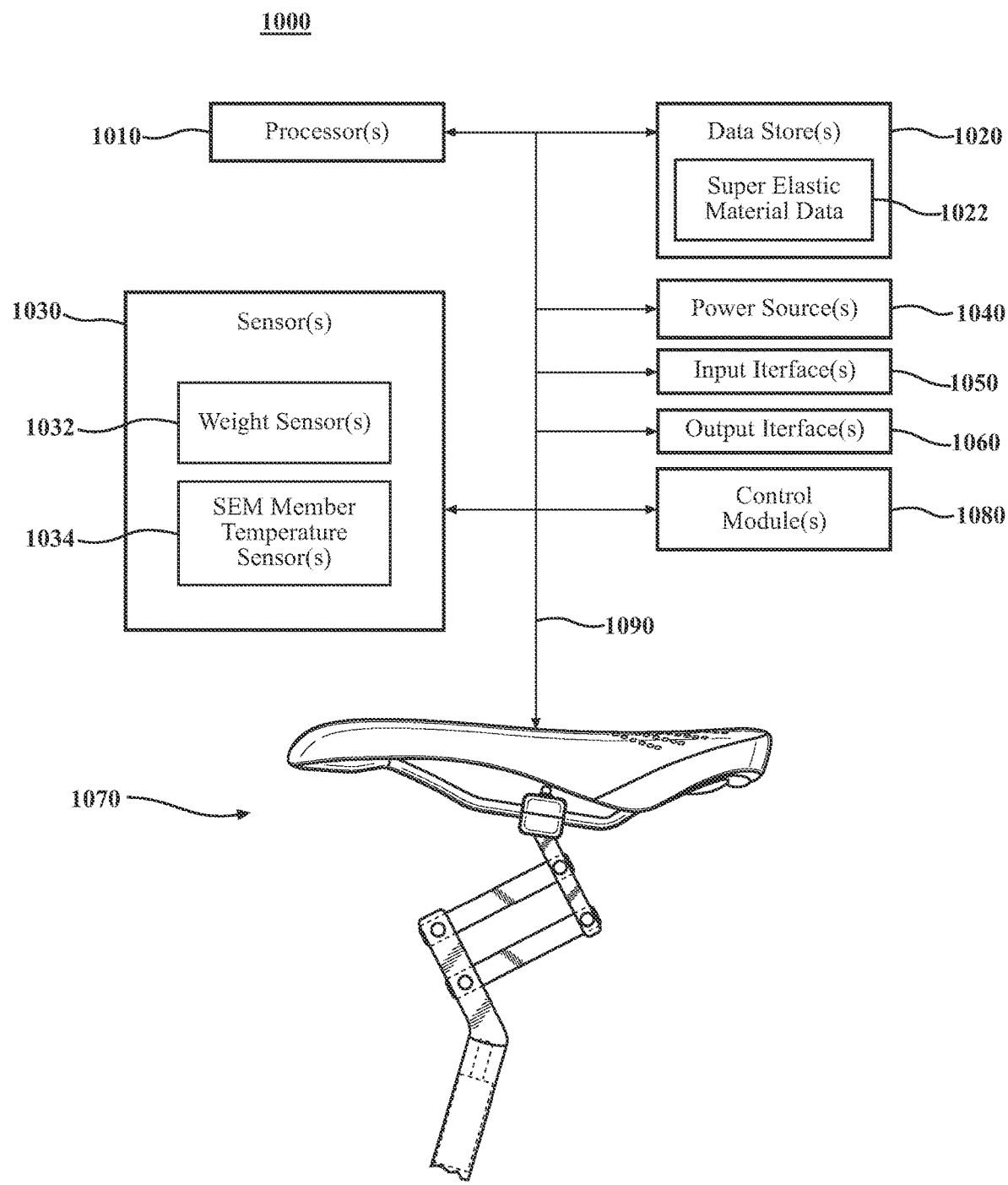
FIG. 10 is an example of a vibration isolation system for a bicycle saddle.

Referring to FIG. 10, an example of a system 1000 for vibration isolation of a seat or saddle is shown. The system 1000 can be used in connection with any type of seat or saddle, such as a bicycle seat or saddle.

The system 1000 can include various elements. Some of the possible elements of the system 1000 are shown in FIG. 10 and will now be described. It will be understood that it is not necessary for the system 1000 to have all of the elements shown in FIG. 10 or described herein. The system 1000 can have any combination of the various elements shown in FIG. 10. Further, the system 1000 can have additional elements to those shown in FIG. 10. In some arrangements, the system 1000 may not include one or more of the elements shown in FIG. 10.

The system 1000 can include one or more processors 1010, one or more data stores 1020, one or more sensors 1030, one or more power sources 1040, one or more input interfaces 1050, one or more output interfaces 1060, a seat or saddle system 1070, and one or more control modules 1080. Each of these elements will be described in turn below.

As noted above, the system 1000 can include one or more processors 1010. "Processor" means any component or group of components that are configured to execute any of the processes described herein or any form of instructions to carry out such processes or cause such processes to be performed. The processor(s) 1010 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 1010 can include at least one hardware circuit (e.g., an integrated circuit) configured to carry out instructions contained in program code. In arrangements in which there is a plurality of processors 1010, such processors can work independently from each other, or one or more processors can work in combination with each other.

The system 1000 can include one or more data stores 1020 for storing one or more types of data. The data store(s) 1020 can include volatile and/or non-volatile memory. Examples of suitable data stores 1020 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 1020 can be a component of the processor(s) 1010, or the data store(s) 1020 can be operatively connected to the processor(s) 1010 for use thereby.

In some arrangements, the data store(s) 1020 can store super elastic material data 1022 about one or more super elastic material members, including the super elastic material member(s) 150. As an example, the data store(s) 1020 can store stress-strain curves and/or force-deflection curves for one or more super elastic material members, such as any of those used in the vibration isolator 110. For each super elastic material member, the stress-strain curves and/or the force-deflection curves can show the performance of the respective super elastic material member at different temperatures.

Figure 11:
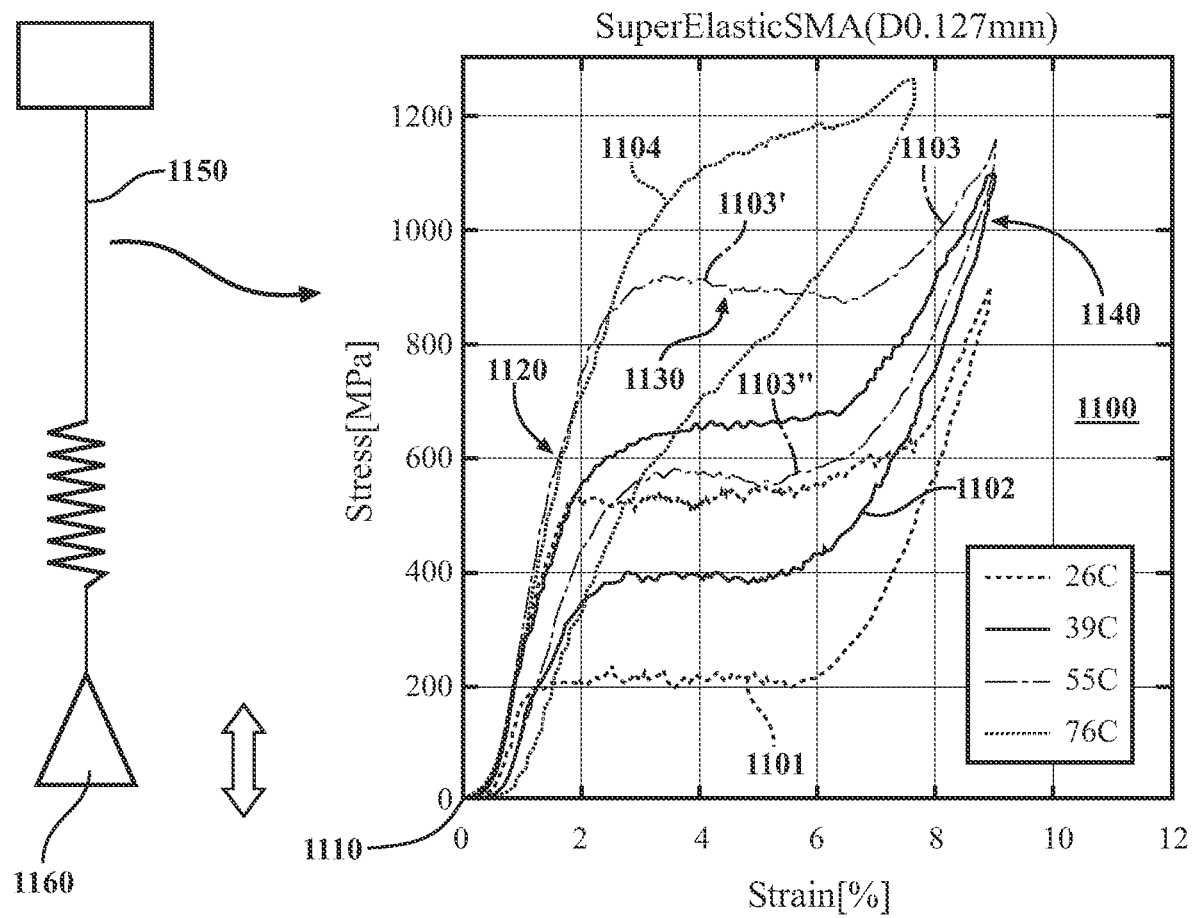
FIG. 11 is an example graph of stress-strain curves for a super elastic material member at different temperatures.

Referring to FIG. 11, a graph 1100 showing example stress-strain curves for a super elastic material member is shown. The graph 1100 can be for an example super elastic material member 1150 under a load 1160. The stress-strain curves can be at a plurality of different temperatures. In this example, stress-strain curves 1101, 1102, 1103, 1104 are shown for 26° C., 39° C., 55° C., and 76° C., respectively. It is noted that the graph 1100 is merely an example, as the values will vary depending on various characteristics of each particular super elastic material member.

Stiffness of the super elastic material member can be temperature dependent. As a result, the stiffness characteristics of the super elastic material member can change with changes in temperature. The general shape of the stress-strain curves 1101, 1102, 1103, 1104 can represent the stiffness profile of the super elastic material member at different temperatures. As an example, the stress-strain curve 1103 will be described. Starting from the origin 1110, the super elastic material member can exhibit an initial stiffness region 1120 that is substantially linear. The super elastic material member can be relatively stiff in the initial stiffness region 1120. When load is reached, the stress-strain curve 1103 can become zero or substantially zero, which can be referred to as a quasi-zero stiffness region 1130. The quasi-zero stiffness region 1130 can allow for good vibration isolation. Continuing beyond the quasi-zero stiffness region 1130, the stress-strain curve 1103 can have a subsequent stiffness region 1140 that is substantially linear. The super elastic material member can be relatively stiff in the subsequent stiffness region 1140.

The stress-strain curve 1103 has a first portion 1103' and a second portion 1103". The first portion 1103' represents the super elastic material member going from a non-loaded state to a loaded state. A second portion 1103" represents the super elastic material member going from a loaded state to a non-loaded state.

It should be noted that, at each temperature, the super elastic material member can exhibit the quasi-zero stiffness region at a different stress level. Thus, the appropriate stiffness profile can be selected for the super elastic material member based on real-time loading conditions.

Further, it is noted that, at some temperature levels, the stiffness characteristics of the super elastic material member may not be as desirable because the quasi-zero stiffness region may be lost. As an example, the stress-strain curve 1104 does not include a quasi-zero stiffness region. Thus, for the example super elastic material member shown in FIG. 11, it may not be desirable to heat the super elastic material member beyond 55° C.

The system 1000 can include one or more sensors 1030. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the system 1000 includes a plurality of sensors 1030, the sensors can work independently from each other. Alternatively, two or more of the sensors can work in combination with each other. In such case, the two or more sensors can form a sensor network. The sensor(s) 1030 can be operatively connected to the processor(s) 1010, the data store(s) 1020, and/or other elements of the system 1000 (including any of the elements shown in FIG. 10).

The sensor(s) 1030 can include any suitable type of sensor. Various examples of different types of sensors will be described herein. However, it will be understood that the embodiments are not limited to the particular sensors described.

The sensor(s) 1030 can include one or more weight sensors 1032. The weight sensor(s) 1032 can include any sensor, now known or later developed, configured to detect, determine, assess, monitor, measure, quantify and/or sense any information or data about a weight of an occupant of the saddle 102. The weight sensor(s) 1032 can be located under the saddle 102. In one or more arrangements, the sensor(s) 1030 can include one or more super elastic material member temperature sensors 1034. The super elastic material member temperature sensor(s) 1034 can be any sensor configured to detect, determine, assess, monitor, measure, quantify and/or sense the temperature of a super elastic material member, now known or later developed.

As noted above, the system 1000 can include one or more power sources 1040. The power source(s) 1040 can be any power source capable of and/or configured to energize the super elastic material members, as will be described later. For example, the power source(s) 1040 can include one or more batteries, one or more fuel cells, one or more generators, one or more alternators, one or more solar cells, and combinations thereof.

The system 1000 can include one or more input interfaces 1050. An "input interface" includes any device, component, system, element or arrangement or groups thereof that enable information/data to be entered into a machine. The input interface(s) 1050 can receive an input from a person (e.g., a bicycle rider). Any suitable input interface 1050 can be used, including, for example, a keypad, display, touch screen, multi-touch screen, switch, button, joystick, mouse, trackball, microphone and/or combinations thereof.

The system 1000 can include one or more output interfaces 1060. An "output interface" includes any device, component, system, element or arrangement or groups thereof that enable information/data to be presented to a person. The output interface(s) 1060 can present information/data to an occupant of the saddle 102. The output interface(s) 1060 can include a display, and earphone, and/or a speaker. Some components of the system 1000 may serve as both a component of the input interface(s) 1050 and a component of the output interface(s) 1060.

The system 1000 can include a set or saddle system 1070. The saddle system 1070 can include a seat or a saddle and a vibration isolator. The above description of the saddle 102 and the vibration isolator 110 apply equally the same elements in the saddle system 1070.

The system 1000 can include one or more modules, at least some of which will be described herein. The modules can be implemented as computer readable program code that, when executed by a processor, implement one or more of the various processes described herein. One or more of the modules can be a component of the processor(s) 1010, or one or more of the modules can be executed on and/or distributed among other processing systems to which the processor(s) 1010 is operatively connected. The modules can include instructions (e.g., program logic) executable by one or more processor(s) 1010. Alternatively or in addition, one or more data stores 1020 may contain such instructions.

In one or more arrangements, the modules described herein can include artificial or computational intelligence elements, e.g., neural network, fuzzy logic, or other machine learning algorithms. Further, in one or more arrangements, the modules can be distributed among a plurality of modules. In one or more arrangements, two or more of the modules described herein can be combined into a single module.

The system 1000 can include one or more control modules 1080. The control module(s) 1080 can include profiles and logic for actively controlling the stiffness characteristics of the super elastic material member(s) 150 of the vibration isolator 110. The control module(s) 1080 can be configured to determine when the stiffness characteristics of the super elastic material member(s) 150 of the vibration isolator 110, such as the stiffness profile, should be adjusted. The control module(s) 1080 can be configured to do so in any suitable manner. For instance, the control module(s) 1080 can be configured to analyze data or information acquired by the sensor(s) 1030 (e.g., the weight sensor(s) 1032 and/or other sensors). The control module(s) 1080 can retrieve raw data from the sensor(s) 1030 and/or from the data store(s) 1020. The control module(s) 1080 can use profiles, parameters, or setting loaded into the control module(s) 1080 and/or stored in the data store(s) 1020, such as the super elastic material data 1022. Alternatively or additionally, the control module(s) 1080 can be configured to detect user inputs (e.g., commands) provided on the input interface(s) 1050.

The control module(s) 1080 can analyze the sensor data to determine an appropriate action for the super elastic material member(s) 150. The control module(s) 1080 can be configured to cause the stiffness of the one or more super elastic material member(s) 150 to be adjusted. As used herein, "cause" or "causing" means to make, force, compel, direct, command, instruct, and/or enable an event or action to occur or at least be in a state where such event or action may occur, either in a direct or indirect manner. For instance, the control module(s) 1080 can cause the super elastic material member(s) 150 to be selectively heated or cooled. As noted above, the stiffness of the super elastic material member(s) can be temperature dependent. The super elastic material member(s) 150 can be heated or cooled in any suitable manner, now known or later developed. For instance, super elastic material member(s) 150 can be heated by the Joule effect by passing electrical current through the super elastic material member(s) 150. To that end, the control module(s) 1080 can be configured to selectively permit, restrict, adjust, alter, and/or prevent the flow of electrical energy from the power source(s) 1040 to the one or more super elastic material member(s) 150 associated with the vibration isolator 110 operatively connected to the saddle 102. The control module(s) 1080 can be configured send control signals or commands over a communication network 1090 to the super elastic material member(s) 150 or to other elements of the system 1000.

The control module(s) 1080 can be configured to cause the stiffness characteristics of the super elastic material member(s) 150 associated with the vibration isolator 110 to be adjusted based on one or more parameters. For instance, the control module(s) 1080 can be configured to cause the stiffness characteristics of the super elastic material member(s) 150 to be adjusted based on real-time conditions as detected by the sensor(s) 1030, such as seat occupant weight. Based on such real-time conditions, the control module(s) 1080 can determine suitable stiffness characteristics for the super elastic material member(s) 150. The control module(s) 1080 can query the data store(s) 1020 for data about the super elastic material member(s) 150. For instance, the control module(s) 1080 can query the super elastic material data 1022, such as the stress-strain curves and/or force-deflection curves for the super elastic material member(s) 150. The control module(s) 1080 can be configured to select or determine a target temperature for the super elastic material member(s) 150 to achieve a desired stiffness characteristic. For instance, the target temperature can be based on one of the stress-strain curves, or it can be interpolated using the two stress-strain curves that bracket the desired stiffness characteristics.

Once a target temperature is selected, the control module(s) 1080 can compare a current temperature of the super elastic material member(s) 150, as determined by the super elastic material member temperature sensor(s) 1034, to the target temperature. If the super elastic material member(s) 150 need to be heated above their current temperature, then the control module(s) 1080 can be configured to selectively permit or increase the flow of electrical energy from the power source(s) 1040 to the super elastic material member(s) 150 associated with the vibration isolator 110. If the super elastic material member(s) 150 need to be cooled below their current temperature, then the control module(s) 1080 can be configured to selectively decrease, restrict, or discontinue the flow of electrical energy from the power source(s) 1040 to the super elastic material member(s) 150 associated with the vibration isolator 110. In some arrangements, the control module(s) 1080 can be configured to activate a cooling source (e.g., a fan, a blower, a cooler, etc.) to facilitate the cooling of the super elastic material member(s) 150. If the current temperature of the super elastic material member(s) 150 is substantially equal to the target temperature, then the control module(s) 80 can take any suitable action with respect to the flow of electrical energy from the power source(s) 1040 to the super elastic material member(s) 150 associated with the vibration isolator 110 so that the current temperature is maintained. The control module(s) 1080 can be configured send control signals or commands over the communication network 1090 to the super elastic material member(s) 150 or other elements of the system 1000 or the vibration isolator 110.

The selective varying of the stiffness characteristics of the super elastic material member(s) 150 can be performed at any suitable time. For instance, the selective varying can be performed on a continuously, periodically, irregularly, or even randomly.

In some instances, the control module(s) 1080 can be configured to cause the stiffness characteristics of the super elastic material member(s) 150 to be selectively adjusted based on user inputs (e.g., commands). For instance, a user can provide an input on the input interface(s) 1050. The input can be to adjust the stiffness characteristics of the super elastic material member(s) 150. The control module(s) 1080 can be configured to cause the stiffness characteristics of the super elastic material member(s) 150 to be adjusted in accordance with the user input.

When the vibration isolator includes a plurality of super elastic material members 150, the control module(s) 1080 can be configured to control the stiffness characteristics of each super elastic material member 150 individually. Alternatively, the control module(s) 1080 can be configured to control the stiffness characteristics of a plurality of super elastic material members 150 collectively. Thus, the stiffness characteristics of each super elastic material members 150 can be adjusted at substantially the same time, to the same degree of actuations, and/or in substantially the same manner.

The various elements of the system 1000 can be communicatively linked to one another or one or more other elements through one or more communication networks 1090. As used herein, the term "communicatively linked" can include direct or indirect connections through a communication channel, bus, pathway or another component or system. A "communication network" means one or more components designed to transmit and/or receive information from one source to another. The data store(s) 1020 and/or one or more other elements of the system 1000 can include and/or execute suitable communication software, which enables the various elements to communicate with each other through the communication network and perform the functions disclosed herein.

The one or more communication networks 1090 can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

It will be appreciated that arrangements described herein can provide numerous benefits, including one or more of the benefits mentioned herein. For example, arrangements described herein can isolate the vibrations of a bicycle saddle. Arrangements described herein can improve rider comfort and/or ride quality. Arrangements described herein can allow for the adjustment of vibration isolation characteristics based on real-time conditions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC, or ABC).

As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope of the invention.

What is claimed is:

1. A vibration isolator comprising:
a first landing;
a second landing spaced from the first landing;
a plunger located between the first landing and the second landing;
a first plurality of super elastic material members operatively connected to the first landing and to the plunger; and
a second plurality of super elastic material members operatively connected to the plunger and to the second landing,
the vibration isolator being configured to exhibit a non-linear stiffness profile, the non-linear stiffness profile including a region of quasi-zero stiffness, the non-linear stiffness profile of the vibration isolator being selectively variable by controlling a temperature of the one or more super elastic material members.

2. The vibration isolator of claim 1, wherein at least one of:
the first plurality of super elastic material members extend at substantially 90 degrees relative to the first landing; and
the second plurality of super elastic material members extend at substantially 90 degrees relative to the second landing.

3. The vibration isolator of claim 1, wherein at least one of the first plurality of super elastic material members and the second plurality of super elastic material members are cables or wires.

4. The vibration isolator of claim 1, wherein at least one of:
the first plurality of super elastic material members extend in a parabolic configuration; and
the second plurality of super elastic material members extend in a parabolic configuration.

5. The vibration isolator of claim 1, wherein at least one of the first landing and the second landing are fixed.

6. The vibration isolator of claim 1, wherein at least one of the first plurality of super elastic material members and the second plurality of super elastic material members are super elastic shape memory alloys.

7. A vibration isolator comprising:
a first landing;
a second landing spaced from the first landing;
a plunger located between the first landing and the second landing;
a first plurality of super elastic material members operatively connected to the first landing and to the plunger; and
a second plurality of super elastic material members operatively connected to the plunger and to the second landing,
the vibration isolator being configured to exhibit a non-linear stiffness profile, the non-linear stiffness profile including a region of quasi-zero stiffness,
at least one of:
the first plurality of super elastic material members extend at an acute angle relative to the first landing; and
the second plurality of super elastic material members extend at an acute angle relative to the second landing.

8. A vibration isolator comprising:
a first landing;
a second landing spaced from the first landing;
a plunger located between the first landing and the second landing;
a first plurality of super elastic material members operatively connected to the first landing and to the plunger; and
a second plurality of super elastic material members operatively connected to the plunger and to the second landing,
the vibration isolator being configured to exhibit a non-linear stiffness profile, the non-linear stiffness profile including a region of quasi-zero stiffness,
at least one of the first plurality super elastic material members and the second plurality of super elastic material members being pre-stretched to a quasi-zero stiffness region of the non-linear stiffness profile.

9. A vibration isolator comprising:
a first landing;
a second landing spaced from the first landing;
a plunger located between the first landing and the second landing;

a first plurality of super elastic material members operatively connected to the first landing and to the plunger; and a second plurality of super elastic material members operatively connected to the plunger and to the second landing, the vibration isolator being configured to exhibit a non-linear stiffness profile, the non-linear stiffness profile including a region of quasi-zero stiffness, the one or more super elastic material members being configured to be stretched to a quasi-zero stiffness region of the non-linear stiffness profile when loaded.

10. A vibration isolator comprising:

a first landing;

a second landing spaced from the first landing;

a plunger located between the first landing and the second landing;

a first plurality of super elastic material members operatively connected to the first landing and to the plunger; and a second plurality of super elastic material members operatively connected to the plunger and to the second landing, the vibration isolator being configured to exhibit a non-linear stiffness profile, the non-linear stiffness profile including a region of quasi-zero stiffness, when the plunger moves toward the second landing, the first plurality of super elastic material members are stretched and the second plurality of super elastic material members become less stretched while remaining in tension.

11. A system for vibration isolation of a bicycle saddle, the system comprising:

a bicycle saddle;

a bicycle frame, the bicycle saddle being operatively connected to the bicycle frame; and a vibration isolator located within a portion of the bicycle frame, the vibration isolator being operatively positioned with respect to the bicycle saddle, the vibration isolator being configured to exhibit a non-linear stiffness profile, the non-linear stiffness profile including a region of quasi-zero stiffness, the vibration isolator including one or more super elastic material members, the vibration isolator including:

a first landing;

a second landing spaced from the first landing;

a plunger located between the first landing and the second landing;

a first plurality of super elastic material members operatively connected to the first landing and to the plunger; and a second plurality of super elastic material members operatively connected to the plunger and to the second landing, the one or more super elastic material members being configured to be stretched to a quasi-zero stiffness region of the non-linear stiffness profile when loaded.

12. A system for vibration isolation of a bicycle saddle, the system comprising:

a bicycle saddle;

a bicycle frame, the bicycle saddle being operatively connected to the bicycle frame; and a vibration isolator located within a portion of the bicycle frame, the vibration isolator being operatively positioned with respect to the bicycle saddle, the vibration isolator being configured to exhibit a non-linear stiffness profile, the non-linear stiffness profile including a region of quasi-zero stiffness, the vibration isolator including one or more super elastic material members, the vibration isolator including:

a first landing;

a second landing spaced from the first landing;

a plunger located between the first landing and the second landing;

a first plurality of super elastic material members operatively connected to the first landing and to the plunger; and a second plurality of super elastic material members operatively connected to the plunger and to the second landing, when the plunger moves toward the second landing, the first plurality of super elastic material members are stretched and the second plurality of super elastic material members become less stretched while remaining in tension.

13. The system of claim 12, wherein at least one of:

the first plurality of super elastic material members extend in a parabolic configuration; and the second plurality of super elastic material members extend in a parabolic configuration.

14. The system of claim 12, wherein-at least one of:

the first plurality of super elastic material members extend at substantially 90 degrees relative to the first landing; and the second plurality of super elastic material members extend at substantially 90 degrees relative to the second landing.

15. A system for vibration isolation of a bicycle saddle, the system comprising:

a bicycle saddle;

a bicycle frame, the bicycle saddle being operatively connected to the bicycle frame; and a vibration isolator located within a portion of the bicycle frame, the vibration isolator being operatively positioned with respect to the bicycle saddle, the vibration isolator being configured to exhibit a non-linear stiffness profile, the non-linear stiffness profile including a region of quasi-zero stiffness, the vibration isolator including one or more super elastic material members, the vibration isolator including:

a first landing;

a second landing spaced from the first landing;

a plunger located between the first landing and the second landing;

a first plurality of super elastic material members operatively connected to the first landing and to the plunger; and a second plurality of super elastic material members operatively connected to the plunger and to the second landing, at least one of:

the first plurality of super elastic material members extend at an acute angle relative to the first landing; and the second plurality of super elastic material members extend at an acute angle relative to the second landing.

16. A system for vibration isolation of a bicycle saddle, the system comprising:
- a bicycle saddle;
- a bicycle frame, the bicycle saddle being operatively connected to the bicycle frame; and
- a vibration isolator located within a portion of the bicycle frame, the vibration isolator being operatively positioned with respect to the bicycle saddle, the vibration isolator being configured to exhibit a non-linear stiffness profile, the non-linear stiffness profile including a region of quasi-zero stiffness, the vibration isolator including:
  - a first landing;
  - a second landing spaced from the first landing;
  - a plunger located between the first landing and the second landing;
  - a first plurality of super elastic material members operatively connected to the first landing and to the plunger; and
  - a second plurality of super elastic material members operatively connected to the plunger and to the second landing,
- the non-linear stiffness profile of the vibration isolator being selectively variable by controlling a temperature of at least one of the first plurality of super elastic material members and the second plurality of super elastic material members.

17. A system for vibration isolation of a bicycle saddle, the system comprising:
- a bicycle saddle;
- a bicycle frame, the bicycle saddle being operatively connected to the bicycle frame; and
- a vibration isolator located within a portion of the bicycle frame, the vibration isolator being operatively positioned with respect to the bicycle saddle, the vibration isolator being configured to exhibit a non-linear stiffness profile, the non-linear stiffness profile including a region of quasi-zero stiffness, the vibration isolator including:
  - a first landing;
  - a second landing spaced from the first landing;
  - a plunger located between the first landing and the second landing;
  - a first plurality of super elastic material members operatively connected to the first landing and to the plunger; and
  - a second plurality of super elastic material members operatively connected to the plunger and to the second landing,
- at least one of the first plurality of super elastic material members and the second plurality of super elastic material members being pre-stretched to a quasi-zero stiffness region of the non-linear stiffness profile.

* * * * *